Nov. 17, 1953
E. F. RIOPELLE
2,659,218
FLEXIBLE COUPLING
Filed Nov. 5, 1947
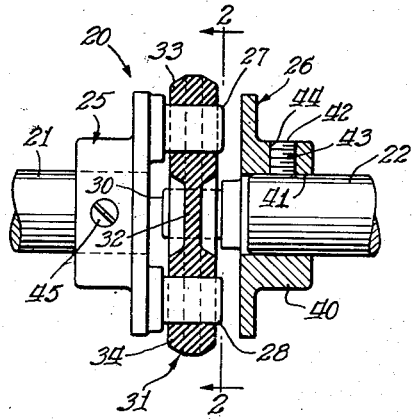
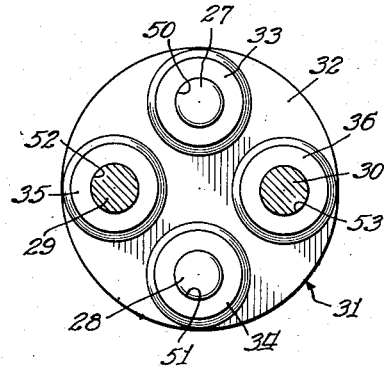
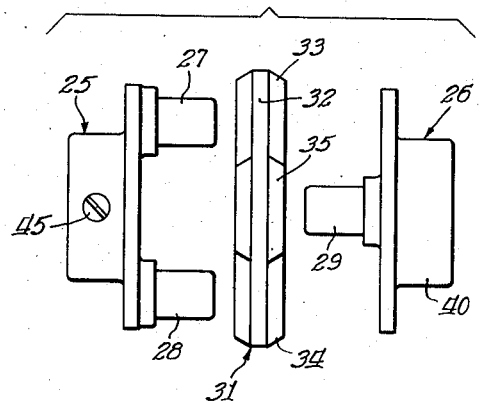
Inventor:
Earl F. Riopelle Patented Nov. 17, 1953

2,659,218

UNITED STATES PATENT OFFICE 2,659,218

FLEXIBLE COUPLING

Earl F. Riopelle, Detroit, Mich., assignor to Morse Chain Company, Ithaca, N. Y., a corporation of New York Application November 5, 1947, Serial No. 784,114

1 Claim. (Cl. 64—13)

This invention relates in general to flexible couplings and is particularly concerned with couplings of the type characterized as having incorporated therein a coupling center molded as a unit.

A principal object and accomplishment of the present invention is to provide a flexible coupling having incorporated therein a unit molded coupling center adaptable to effectively withstand a relatively high operating deflection and angular or parallel misalignment of the shafts to which the flexible coupling may be employed.

The invention seeks, as a further object and accomplishment, to provide a flexible coupling as contemplated herein and characterized by an arrangement of parts to more advantageously and satisfactorily perform the function required of it and adapted to provide a compact unit which will successfully combine the factors of structural simplicity and durability, and yet be economical to manufacture.

Another object and accomplishment of the invention is to provide a flexible coupling having incorporated therein a unit molded coupling center, said flexible coupling having a highly desirable feature of easy and convenient assembly and placement in operative position between two shafts which are desired to be coupled, and the highly desirable feature of replaceability of said unit molded coupling center without necessitating removal of the coupling from the shafts and without necessitating any disturbance to the shafts to which the flexible coupling is secured.

Another object and accomplishment of the invention is to improve the construction of flexible couplings as herein contemplated with respect to efficiency of operation; and to this end, an important feature of the invention is to provide a flexible coupling comprising, in general, two flanged members disposed in confronting relationship with respect to each other and each such flanged member having means adaptable to secure it to a respective shaft, each of said flanged members having at least two pins formed integrally therewith and extending outwardly therefrom in a direction axially of the shafts, and a coupling center molded of a flexible material such as, for example, rubber with impregnated cotton floc and formed to define a web of constant thickness and at least four bosses having central through apertures adaptable to accommodate said pins, said coupling center being characterized as being adaptable to carry by equal tensile and compressive loadings in the web portion at either side of a respective boss, force applied at any boss by an associated flange pin.

Additional objects, features and advantages of the invention disclosed herein will be apparent to persons skilled in the art after the construction and operation are understood from the within description.

It is preferred to accomplish the various objects of this invention and to practice the same in substantially the manner hereinafter fully described and as more particularly pointed out in the appended claim, reference being had to the accompanying drawing, which forms a part of this specification, wherein:

Fig. 1 is a sectional elevational view of a flexible coupling embodying the features of the present invention, said flexible coupling being shown in its operative position associated with a pair of shafts to be coupled;

Fig. 2 is a sectional elevational view of the flexible coupling depicted in Fig. 1 and being taken substantially on the plane of the line 2—2 in Fig. 1 and being a particular illustration in elevation of the coupling center contemplated herein; and Fig. 3 is an exploded side elevational view of the flexible coupling depicted in Fig. 1.

The drawing is to be understood to be more or less of a schematic character for the purpose of illustrating and disclosing a preferred form of the improvements contemplated herein, and in the drawing like reference characters identify the same parts in the several views.

In the exemplary embodiment of the invention depicted in Figs. 1, 2 and 3, I have illustrated the flexible coupling with which the present invention is particularly concerned and designated in its entirety by the numeral 20, as being operatively associated with a conventional shaft 21 and a conventional shaft 22, said flexible coupling 20 being adaptable advantageously to couple said shafts for operation thereof in unison, said flexible coupling comprising in general, a flanged member 25 and a flanged member 26 each being disposed in confronting relationship with respect to each other, and each such flanged member having means adaptable to secure it to a respective shaft as shown. The flanged member 25 is provided with at least two pins, such as at 27 and 28, preferably formed integral therewith and extending outwardly therefrom in a direction axially of the shafts. In like manner, the flanged member 26 is provided with at least two pins, as at 29 and 30, formed integrally therewith and extending outwardly therefrom in a direction axially of the shafts. A coupling center designated in its entirety by the numeral 31 is operatively associated with the flanged member 25 and the flanged member 26 and is, preferably, molded of a flexible material such as, for example, rubber with impregnated cotton floc and formed to define a web 32 of constant thickness and at least four bosses 33, 34, 35 and 36, each of said bosses having a central through aperture adaptable to accommodate one of said pins, said coupling center being characterized as being adaptable to carry by equal tensile and compressive loadings in the web portion at either side of a respective boss, force applied at any boss by an associated flange pin.

In accordance with the construction of the present invention the flanged members 25 and 26 are of identical construction, and for this reason it is deemed sufficient to describe only one such flanged member in detail. In adverting to Fig. 1, it may be seen that the flanged member 26 is provided with a hub 40 provided with a central through aperture 41 adaptable to receive the shaft 22. In order to fixedly secure the flanged member 26 to the shaft, I have provided a set screw 42 having threaded formations 43 adaptable to be received into complementary threaded formations in an aperture 44 disposed in the hub 40, said screw 42 being adaptable to engage portions of the shaft 22, thereby holding flanged member 26 in its operative position on the shaft 22. It can be seen that the flanged member 25 is also provided with a set screw 45 of the same general construction and function hereinbefore described with respect to the set screw 42.

Adverting to Figs. 2 and 3, it can be seen that the coupling center 31 is formed to define a substantially circular shape and is provided with a web 32 of constant thickness and is molded so as to have integrally formed therewith the bosses 33, 34, 35 and 36 which are circular in shape and provided with conical sides. The bosses 33, 34, 35 and 36 are each respectively provided with central through apertures 50, 51, 52 and 53, the apertures 50 and 51 being adaptable to receive the flange pins 27 and 28 respectively, and the apertures 52 and 53 being adaptable to receive the flange pins 29 and 30 respectively. It is notable that a snug fit between the apertures in the coupling center 31 and the respectively associated pins is preferred, such snug fit being important because of the adaptability thereof to enable the coupling center 31 to take the full rated torque load with negligible gapping away from the pins. It is notable that the force applied at any boss by an associated flange pin is carried by equal tensile and compressive loadings in the web portion at either side of the boss.

Thus it can be seen that the flexible coupling 20 of this invention is comprised solely of three unitary parts as follows: duplicate driving and driven members indicated as at 25 and 26, and a torque transmitting center member 31 disposed therebetween.

The torque transmitting center member 31 defines a flexible connection between said driving and driven members 25 and 26 and comprises a unitary integrally molded rubber disc having therein an axial region and a first plurality of regions extending radially therefrom, all of said regions being imperforate and having the same thickness, a second plurality of regions radially beyond said central imperforate region and arranged between said first radial regions and each having an aperture therein, frusto conical annular bosses 33, 34, 35 and 36, molded integral with and adjoining said first radial regions, and said bosses defining portions which are thicker than the disc central region.

The studs 27 and 28 on said driving flanged member enter in snug fitting relationship into diametrically opposite apertures 50 and 51 with the adjacent surfaces of the bosses 33 and 34 in spaced relationship to the shoulder portions of said studs for permitting free distortion of said flexible unitary center member 31 in response to angular twist of said center member resulting from axial angularity between said driving and driven members.

The studs 29 and 30 of said driven flanged member enter in snug fitting relationship in diametrically opposite apertures 52 and 53 with the adjacent surface of said bosses in spaced relationship to the shoulder portions of said studs to permit free distortion of said flexible unitary center member 31 in response to angular twist of said center member resulting from axial angularity between said driving and driven members 25 and 26.

The integral imperforate center region of said flexible center member 31 is effective during transmission of torque to directly transmit power diametrically across said center member from the studs of the driving flanged member to the studs of the driven member in planes intersecting each other.

An important feature of the invention is the provision of a flexible coupling which may be quickly and conveniently assembled in operative position to two shafts desired to be coupled together for operation in unison. This is admirably and advantageously accomplished in the present invention by providing a flexible coupling having only three parts that may be easily separated one from the other, namely, the flanged member 25, the coupling member center 31 and the flanged member 26, all three of these parts being illustrated in their separated positions in Fig. 3. It can be seen that the complete flexible coupling assembly as contemplated herein may be provided by causing the flanged pin members to assume their normal assembled position in their respective apertures in the coupling center 31 as illustrated in Fig. 1.

It is notable that the molded coupling center 31 contemplated herein will effectively withstand a relatively high operating deflection and angular or parallel misalignment of the shafts to which the flexible coupling may be employed. Moreover, it is a known fact that constant flexing of rubber will increase the life thereof. Accordingly, it can be seen that angular or parallel misalignment of the shafts will cause such flexing of the rubber as to increase its normal life span.

In the event it is found to be necessary to replace the coupling center 31 for any reason whatsoever, the flanged member 25 illustrated in Fig. 1 may be moved to the left axially of the shaft 21 after loosening the set screw 45, and the flanged member 26 may likewise be moved, but to the right axially of the shaft 22 after loosening of the set screw 42. The flanged members 25 and 26 now assume the positions comparable to those shown in Fig. 3, and it can be seen that the coupling center 31 may be removed from the flexible coupling assembly and a replacement coupling member be substituted therefor. The flanged members then may be moved axially of their respective associated shafts back to their normal position as shown in Fig. 1, the flange pins being disposed in their operative position in the apertures provided in the coupling center 31. With this construction and general arrangement of parts it is possible to repair the flexible coupling without necessitating the removal of the completely assembled coupling from the shafts, or, without necessitating any disturbance to the shafts to which the flexible coupling is secured.

Because of its simple and symmetrical construction, the flexible coupling contemplated herein is economical to manufacture and is readily adaptable to mass production manufacturing methods.

From the foregoing disclosure it can be observed that I have provided a flexible coupling which efficiently fulfills the objects as hereinbefore set forth and provides numerous advantages which may be summarized as follows:

1. Structurally simple, efficient and durable;
2. Economical to manufacture and readily adaptable to mass production manufacturing principles; and
3. The provision of a flexible coupling having incorporated therein a unit molded coupling center adaptable to effectively withstand a relatively high operating deflection and angular or parallel misalignment of the shafts to which the flexible coupling may be employed.

While I have illustrated a preferred embodiment of my invention, many modifications may be made without departing from the spirit of the invention, and I do not wish to be limited to the precise details of construction set forth, but wish to avail myself of all changes within the scope of the appended claim.

I claim:

A flexible coupling comprised solely of three unitary parts as follows: duplicate driving and driven members, and a torque transmitting center member disposed therebetween; each duplicate member comprising a unitary flanged element having a disc-like face arranged in confronting relationship to the other flanged element and the confronting faces being substantially flat; a plurality of shouldered studs projecting axially from the confronting flat faces of said flange elements and being formed integrally therewith; said torque transmitting center member defining a flexible connection between said driving and driven members and comprising a unitary integrally molded rubber disc having therein an axial region and a first plurality of regions extending radially therefrom, all of said regions being imperforate and having the same thickness, a second plurality of regions radially beyond said central imperforate region and arranged between said first radial regions and each having an aperture therein, frusto conical annular bosses molded integral with and adjoining said first radial regions, said bosses defining portions which are thicker than the disc central region; the studs on said driving flanged member being entered in snug fitting relationship in diametrically opposite apertures with the adjacent surfaces of said bosses in spaced relationship to the shoulder portions of said studs for permitting free distortion of said flexible unitary center member in response to angular twist of said center member resulting from axial angularity between said driving and driven members, the studs of said driven flanged member being entered in snug fitting relationship in diametrically opposite apertures with the adjacent surface of said bosses in spaced relationship to the shoulder portions of said studs to permit free distortion of said flexible unitary center member in response to angular twist of said center member resulting from axial angularity between said driving and driven members, and the integral imperforate center region of said flexible center member being effective during transmission of torque to directly transmit power diametrically across said center member from the studs of the driving flanged member to the studs of the driven member in planes intersecting each other.

EARL F. RIOPELLE.

References Cited in the file of this patent

UNITED STATES PATENTS

| Number | Name | Date |
| --- | --- | --- |
| 1,334,439 | Davis | Mar. 23, 1920 |
| 1,504,626 | Kinney | Aug. 12, 1924 |
| 1,626,351 | Nowosielski | Apr. 26, 1927 |
| 1,651,671 | Carrey | Dec. 6, 1927 |
| 1,691,116 | Jencick | Nov. 13, 1928 |
| 1,911,846 | Queen | May 30, 1933 |